(12) United States Patent
Bansal et al.

(10) Patent No.: US 8,655,112 B2
(45) Date of Patent: Feb. 18, 2014

(54) METHOD AND APPARATUS FOR AN IMPROVED WORKFLOW FOR DIGITAL IMAGE EDITING

(75) Inventors: Swarnima Bansal, Noida (IN); Dipanjan Sengupta, Atlanta, GA (US)

(73) Assignee: Adobe Systems Incorporated, San Jose, CA (US)

( * ) Notice: Subject to any disclaimer, the term of this patent is extended or adjusted under 35 U.S.C. 154(b) by 5 days.

(21) Appl. No.: 13/492,367

(22) Filed: Jun. 8, 2012

(65) Prior Publication Data

US 2013/0330021 A1    Dec. 12, 2013

(51) Int. Cl.
*G06K 9/03* (2006.01)

(52) U.S. Cl.
USPC ............................ 382/309; 382/202; 382/283

(58) Field of Classification Search
USPC ......... 382/300, 309, 202, 283, 235, 165, 162, 382/181; 345/619, 629; 358/1.9, 1.18; 715/766
See application file for complete search history.

(56) References Cited

U.S. PATENT DOCUMENTS

| 7,672,521 | B2 * | 3/2010 | Jodra | 382/235 |
| 8,130,238 | B2 * | 3/2012 | Distler | 345/619 |
| 8,325,205 | B2 * | 12/2012 | Distler | 345/619 |

* cited by examiner

*Primary Examiner* — Anh Do
(74) *Attorney, Agent, or Firm* — Moser Taboada (57) ABSTRACT

A method and apparatus for an improved workflow for digital image editing is disclosed. The method comprises accessing a file containing a plurality of effects to apply to an image; merging a plurality of visible layers of the image to create a merged layer; applying the plurality of effects to the merged layer; installing a layer mask on the merged layer; and applying a plurality of user strokes made during an image editing process to the installed layer mask.

20 Claims, 6 Drawing Sheets

METHOD AND APPARATUS FOR AN IMPROVED WORKFLOW FOR DIGITAL IMAGE EDITING

BACKGROUND OF THE INVENTION

1. Field of the Invention

Embodiments of the present invention generally relate to image processing and related techniques, and more particularly, to a method and apparatus for an improved workflow for digital image editing.

2. Description of the Related Art

Digital image editing is the process of altering images. A feature common to many graphics editing software, such as ADOBE® PHOTOSHOP® Elements, involves the use of layers to perform various operations. Every image has at least one layer. When an original image is first opened, a layer comprising the image is created, called a background layer. Layers allow a user to add components and adjustments to an image and work on the components and adjustments one at a time without permanently changing the original image. For each layer, color and brightness may be adjusted, special effects may be applied, layer content may be repositioned, opacity and blending values may be specified, and so on. The stacking order of the layers may be rearranged, layers can be added and removed, and layers may be linked (grouped) so they may be visible and worked on simultaneously.

The use of layers enables maximum flexibility for the user while maintaining non-destructive editing. In non-destructive editing, the original image is not modified in the course of editing. Instead, layers are used to separate different elements of an image. Different kinds of layers exist, each representing a component part of the picture, either as pixels, showing an image (called a pixel layer) or as modification instructions (adjustments), which apply an effect (called an adjustment layer). These layers are stacked on top of one another and depending on the order, determine the appearance of the final picture. A layer can have a certain transparency/opacity and a number of other properties. A layer may have more than a hundred different possible settings. This gives the user a lot of flexibility with editing. An adjustment layer typically applies a common effect like brightness or saturation to other layers. However, because the effect of an adjustment is stored in a separate layer, it is easy to apply that adjustment layer to other layers to test different alternatives, without changing the original layer(s). In addition, an adjustment layer can be edited easily, so the effect can be applied to just a part of the image. This can be accomplished by using a layer mask, which is linked to a pixel layer or an adjustment layer. The layer mask hides parts of the layer to which it is linked, so those parts won't appear in a final version of the edited picture. A layer mask may be black and white or contain shades of grey. What is black on a mask will not be visible in the final picture. What is grey will be more or less transparent, depending on the shade of grey. As the mask layer can be both edited and moved around independently of both the background layer and the layer it applies to; mask layers give the user the ability to test different combinations of overlay. A working layer may refer to any type of layer, but specifically refers to the active layer on which the user is currently working (that is, currently editing).

A list of the layers is typically displayed in a panel in a sidebar of a graphical user interface.

It is known in image editing software to create a file that performs a series of editing steps on an image. The steps are recorded as a script and saved as a file. Thereafter, with a single click within the image editing software, the script is performed on the current image. With current image editing software, editing effects may only be applied to selected areas of the adjustment layers, but may not be applied to the pixel layers.

In order to apply a plurality of effects to pixel layers, a user must manually perform the steps of selecting an effect, creating a new layer (adjustment layer), making a selection of the area to which the effect is to be applied, then double clicking to apply the effect to the selected areas. To apply another effect, these steps must be performed again. In order to change an effect that was just applied, the layer on which the effect was applied must be deleted and the steps noted above repeated once again. In order to change the effect later in the editing process, a user must "undo" each completed step or restart the entire editing process with the original pixel layer.

Further, current image editing software only allows switching effects between adjustment layers. There is no means for switching between a pixel layer linked to a mask and an adjustment layer linked to a mask.

Therefore, there is a need for a method and apparatus for an improved workflow for digital image editing.

SUMMARY OF THE INVENTION

The present invention provides a method and apparatus for an improved workflow for digital image editing. In one embodiment, the method comprises accessing a file containing a plurality of effects to apply to an image. A plurality of visible layers of the image are merged, creating a merged layer. The plurality of effects are applied to the merged layer and a layer mask is installed on the merged layer. Finally, the method applies a plurality of user strokes made during the editing process to the installed layer mask.

While the method and apparatus is described herein by way of example for several embodiments and illustrative drawings, those skilled in the art will recognize that the method and apparatus for an improved workflow for digital image editing are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for an improved workflow for digital image editing as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for applying a plurality of effects to an image. The embodiments utilize an image editing software which uses an effects module to apply a plurality of effects to the image. The method merges the visible layers of the image in the display. A layer mask is created and installed on the merged layer and all user strokes made during the editing process are then applied to the layer mask. Hence, as a user selects areas on an image, the effects are simultaneously applied using the layer mask. A marker may be linked to the layer for easy access later in the editing process. When the marker is selected by a user, the marked layer is made the layer displayed for editing by the user. Further, the present invention comprises a method for seamlessly switching from one effect to another when editing an image. The method stores a user selection in a temporary file. The user selection is made by the user on the working layer. The visible layers are merged and the effects are applied to the merged layer. The method then creates and applies a layer mask based on the user selection store previously. All user strokes made during the editing process are then applied to the layer mask. Hence, the method has enabled switching between a pixel layer with a mask to an adjustment layer with the same mask, keeping the masked and unmasked areas protected.

Various embodiments of an apparatus and method for an improved workflow for digital image editing are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
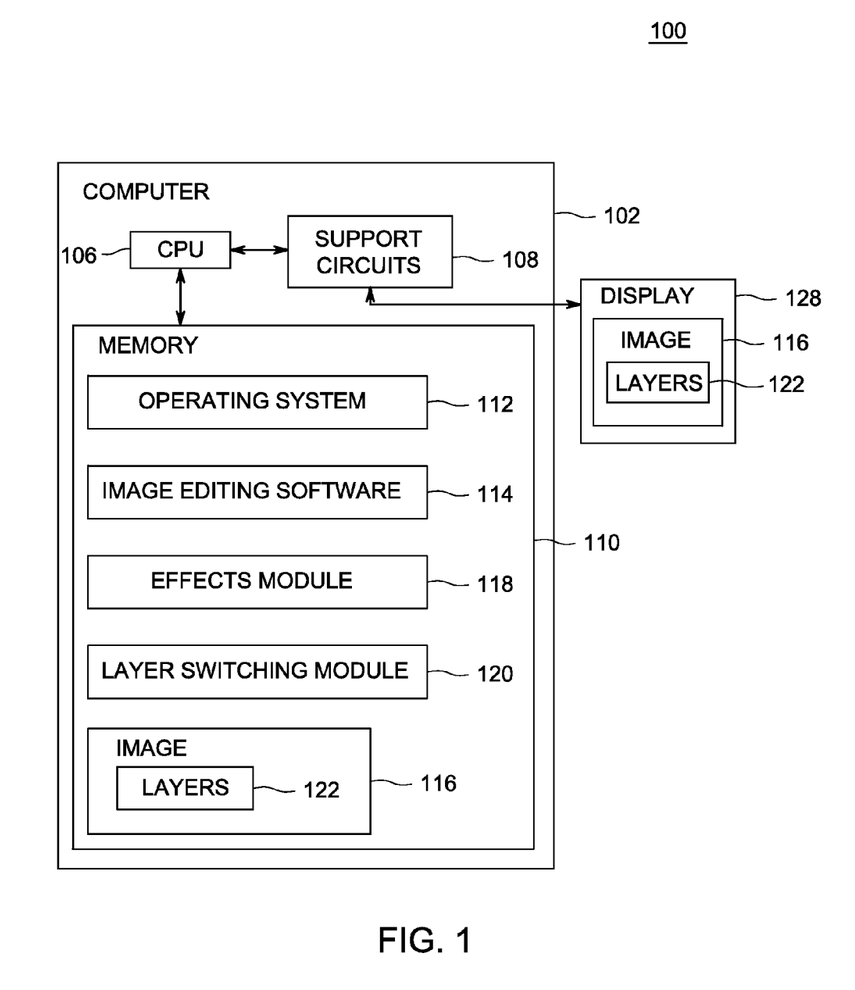
FIG. 1 depicts a block diagram of a system for providing an improved workflow for digital image editing, according to one or more embodiments of the invention.

FIG. 1 depicts a block diagram of a system for providing an improved workflow for digital image editing, according to one or more embodiments of the invention. The system 100 simplifies the workflow for applying a series of effects to an image 116. The system 100 comprises a computer 102 and a display 128.

The computer 102 comprises a CPU 106, support circuits 108, and a memory 110. The computer 102 is a type of computing device (e.g., a laptop, a desktop, a Personal Digital Assistant (PDA) and/or the like) known to one of ordinary skill in the art. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, displays, and the like. The memory 110 comprises at least one of Read Only Memory (ROM), Random Access Memory (RAM), disk drive storage, optical storage, removable storage and/or the like. The memory 110 comprises an operating system 112, image editing software 114, an effects module 118, a layer switching module 120, and an image 116. The image 116 comprises a plurality of layers 122.

According to some embodiments of the invention, the operating system (OS) 112 generally manages various computer resources (e.g., network resources, file processors, and/or the like). The operating system 112 is configured to execute operations on one or more hardware and/or software modules, such as Network Interface Cards (NICs), hard disks, virtualization layers, firewalls and/or the like. Examples of the operating system 112 may include, but are not limited to, Linux, Mac OSX, BSD, UNIX, Microsoft Windows, and the like. The image editing software 114 calls upon commands associated with the operating system 112 (i.e., native operating system commands) to perform various operations, such as editing, applying effects and/or the like, as generally performed by known image editing software applications, such as ADOBE® PHOTOSHOP®, available from ADOBE Systems Incorporated, San Jose, Calif.

According to some embodiments, the effects module 118 applies a plurality of effects to the image 116 on the display 128. The layer switching module 120 allows for seamlessly switching from one effect to another when editing the image 116. The image editing software 114 may include, ADOBE® PHOTOSHOP® Elements, available from ADOBE Systems Incorporated, San Jose, Calif. or any image editing software which uses layers and masks for image editing.

According to some embodiments, the effects module 118 receives an effect or a file containing a series of effects to be applied to the image 116. The effects module 118 applies the effects on the image 116 in real time as the selection for where the effect is to be applied is made. The effects module 118 merges all visible layers 122 of the image 116 and applies the effects to the merged layer. The effects module 118 then creates a layer mask and links it to the merged layer. All user strokes input for image editing are now applied to the merged layer+layer mask by making these linked layers the working layer.

According to some embodiments, the layer switching module 120 advantageously enables easy switching from a first effect to a second effect. A user selects a first effect to apply to an image 116, for example, the image 116 contained on the background layer. As the user makes a selection, the first effect is applied to the image 116. The layer switching module 120 creates a layer with a mask in the layers panel above the background layer. When the user then selects a second effect, the second effect is applied to the image. The layer switching module 120 saves the mask in a temporary channel. A channel is similar to a layer. A channel stores a selection as an editable mask in a Channels panel (similar to the Layers panel). The channel, which contains the selection, may be used to reload a selection at any time, or as in the present case, to load it into another image, i.e. to apply the selection to another layer. The layer switching module 120 deletes the layer that was previously created in the layer panel above the background layer and creates a merged layer in the layer panel on top of the layers below, in this example, the background layer. The second effect is applied and the layer mask which was stored in the temporary channel is saved to this merged layer.

Figure 2A:
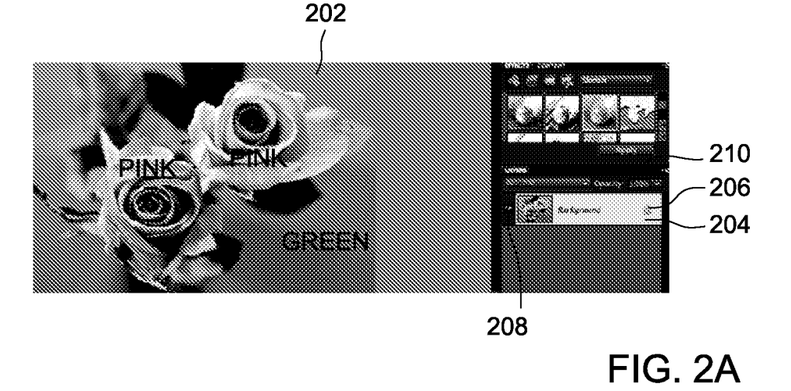
FIGS. 2A-2C collectively illustrate the use of layers and masks as performed by the system of FIG. 1, according to one or more embodiments of the invention
Figure 2B:
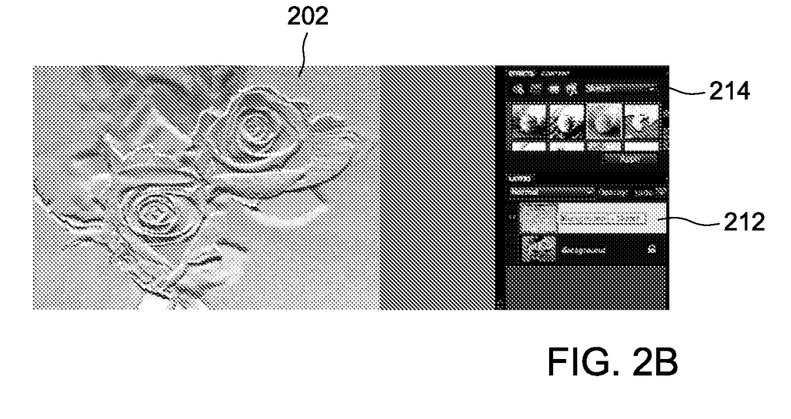
Figure 2C:
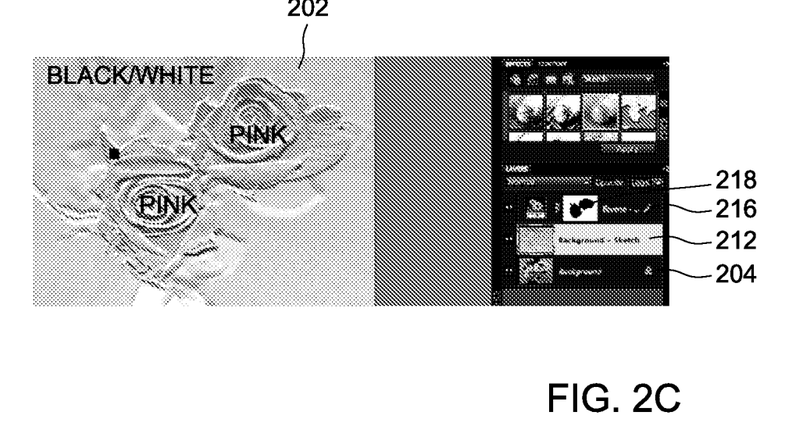

FIGS. 2A-2C collectively illustrate the use of layers and layer masks as performed by the system 100 of FIG. 1. FIG. 2A depicts an image 202 displayed for editing. The image 202 is a pair of pink roses with green leaves. The first time the image 202 is opened with the image editing application, a background layer 204 is created as shown in the layer panel 210. A lock icon 206 denotes that this background layer 204 cannot be altered. The eye symbol 208 denotes that this layer is currently visible FIG. 2B shows the application of an effect to the image 202. The background layer 204 is copied to create layer 212. Now two layers are shown in the layers panel 210. The Sketch effect 214 is then applied to the layer 212. Note that although the display shows an edited image 202, the original image in the background layer 204 is not altered.

FIG. 2C shows a layer 216 with a mask 218. The layer 216 creates a black and white effect on the image 202. If the layer 216 did not have a mask 218, the image 202 would appear to be a black and white version of the original image of the background layer 204. However, the mask 218 has been created on this layer 216. The mask 218 is a white box with areas of black. Where the mask 218 is black, the black and white effect is concealed. Where the mask 218 is white, the black and white effect is revealed. Hence, when this layer is selected to be a visible layer (by selecting the eye icon), the flowers appear pink because the black area of the mask conceals the black and white effect and the rest of the image 202 appears in black and white, because the white area of the mask reveals the black and white effect.

Figure 3:
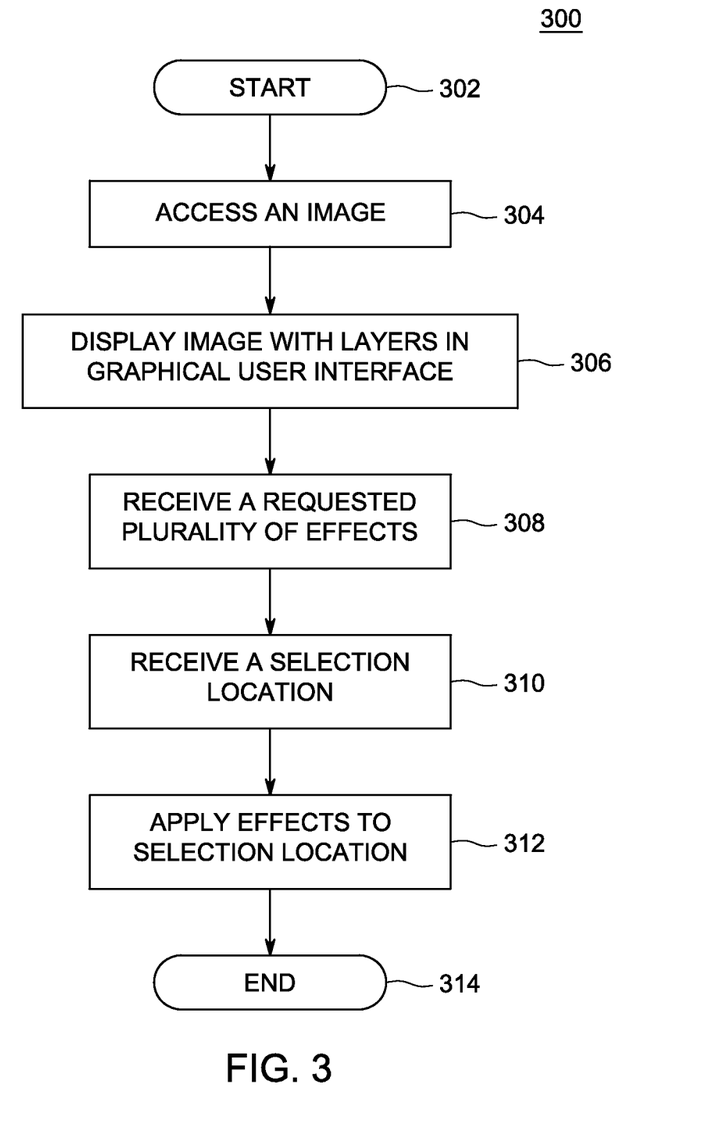
FIG. 3 depicts a flow diagram of a method for applying effects as performed by the effects module of FIG. 1, according to one or more embodiments of the invention.

FIG. 3 depicts a flow diagram of a method 300 for applying effects as performed by the effects module 118 of FIG. 1, according to one or more embodiments of the invention. The method 300 starts at step 302, and proceeds to step 304. At step 304, the method 300 accesses an original image. Every image has at least one layer, such as an image (pixel) layer. When a user first opens an image, a background layer is created for the original image. This background layer is an unalterable image layer that forms the basic layer upon which any and all subsequent editing is performed. A layer separate from the background layer is created each time text or any other modification (adjustment) is made to the original image. All edits are performed on adjustment layers, thereby allowing for editing without altering the original image. The method 300 proceeds to step 306.

At step 306, the method 300 displays to a user using a graphical user interface, the original image as an unalterable background layer along with a plurality of pixel layers, adjustment layers, and any other type of layer created when editing the original image. The layers are stacked one on top of the other to give the appearance of a single image upon display or printing. An effect applied to one area of the original image may be saved in one adjustment layer, while a change in color to another area of the original image may be saved in another adjustment layer. The image displayed on the graphical user interface is the cumulative effect of all of the layers applied to the background layer, in their current order. A reordering of layers may result in a different resulting appearance of the displayed image. A list of the layers in their current order is displayed on a sidebar of the display. The layers may contain markers. A marker is a quick way for a user to find a layer of interest. When a user performs a mouse click on a marker in the sidebar, the associated layer is revealed to the user and becomes the new working layer (i.e., the active layer for editing). The method 300 proceeds to step 308.

At step 308, the method 300 receives an effect that the user has selected to apply to an area of the image. This may be a single effect or it may be a file containing a series of steps, each step representing the application of a single effect. The method 300 proceeds to step 310. At step 310, the method 300 receives a selection location. This selection location is a point in the image where a user has placed a mouse pointer. The user will drag the mouse pointer around the image. Where the user drags the mouse will define an area of the image where the user would like to see the effect applied. The method 300 proceeds to step 312.

At step 312, the effect, or series of effects is applied to the image in the selected location as further disclosed in FIG. 4 below. The method 300 proceeds to step 314 and ends.

Figure 4:
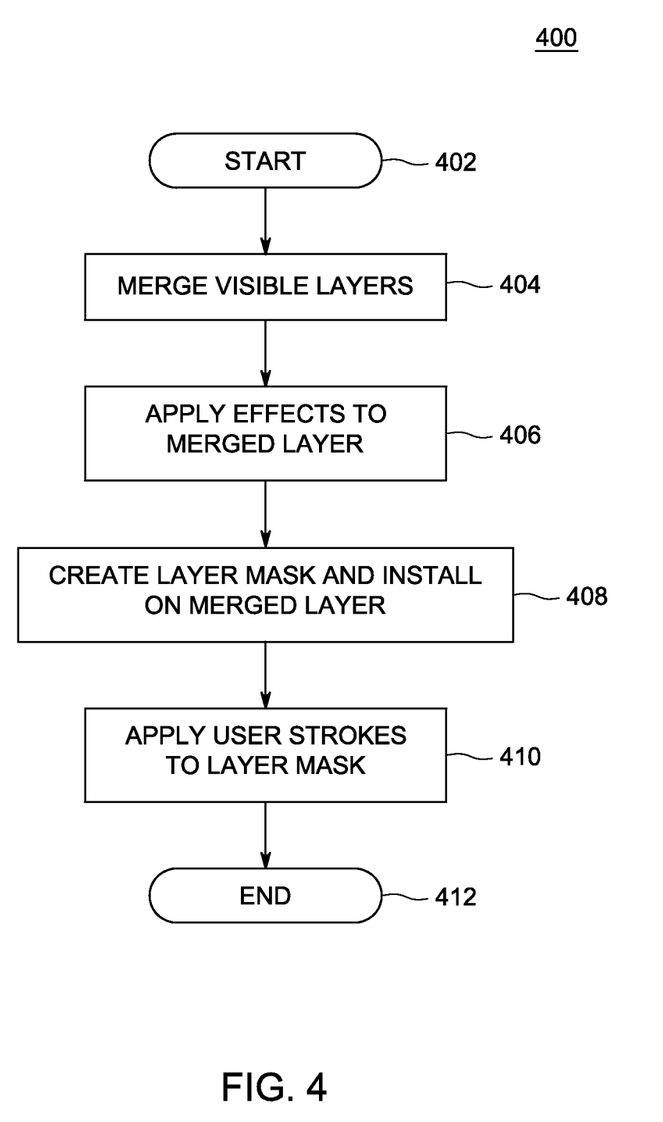
FIG. 4 depicts a flow diagram of additional details of a method for applying the effect(s) to a selection location from FIG. 2, according to one or more embodiments of the invention.

FIG. 4 depicts a flow diagram of additional details of a method 400 for applying the effect(s) to a selection location as depicted from FIG. 3, according to one or more embodiments of the invention.

The method 400 starts at step 402, and proceeds to step 404. At step 404, the method 400 merges the existing visible layers (adjustment and pixel layers) and copies (duplicates) them to a new layer comprising a combination of the images and effects from the visible layers. During the image editing process, any number of layers representing edits to the original image may be created. This allows the user to experiment with different effects alone and in combination on the original image. For example, if the image were a flower, one layer may change the color of the flower to yellow. Another layer may change the color to red. One layer may make the background color blue, while another layer may make the background color green. However, only a few of the layers are currently selected by the user to be visible in the display, for example, the yellow flower with the green background. Only the layers that are currently visible are merged so their effects can be judged by the user. Accordingly, these may be both pixel layers as well as adjustment layers. These visible individual pixel and adjustment layers, however, are untouched. The merged layer comprising the combined effects of the visible layers is, as noted above, what is copied, to a new layer. The merged layer is set as the current working layer. This is the active layer to which the effect(s) is/are being applied. The method 400 proceeds to step 406. At step 406, the method 400 applies the effects on the merged layer. The method 400 proceeds to step 408.

At step 408, the method 400 creates a layer mask and installs it on the working layer. This layer mask and the working layer are now linked. The method proceeds to step 410. At step 410, the method 400 applies user strokes input for image editing onto the layer mask. As the user drags the mouse pointer so as to select various regions on the image, the selected regions get unmasked (that is, visible), while the rest of the effect-applied regions are hidden. Optionally, after the effect is applied, a marker may be linked to the working layer+mask layer. The marker may be used to automatically return to this layer later in the editing process. The method 400 proceeds to step 412 and ends.

Figure 5:
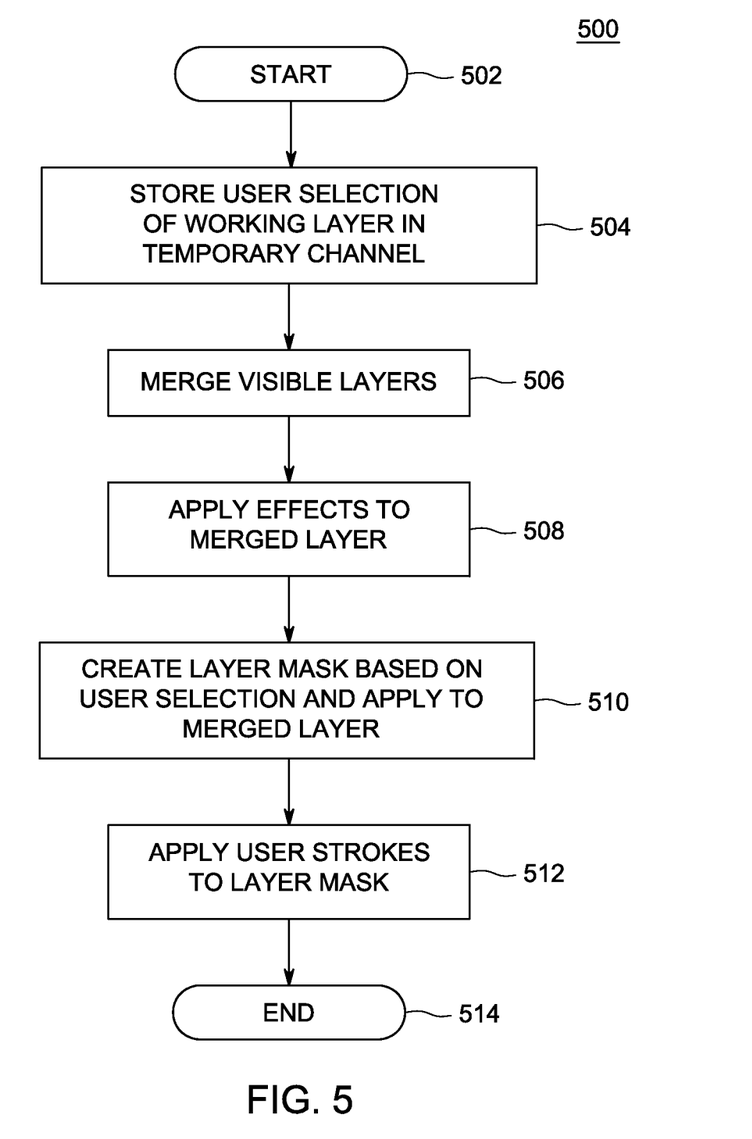
FIG. 5 depicts a method for switching from one effect to another as performed by the layer switching module of FIG. 1, according to one or more embodiments of the invention.

FIG. 5 depicts a method 500 for switching from one effect to another as performed by the layer switching module 120 of FIG. 1, according to one or more embodiments of the invention. Prior to initiating method 500 a user applies a first effect to a selection of an image. A layer with a mask is created in the layers panel above the other layers in the panel. This is the current working layer. The method 500 is initiated when the user selects a second effect to apply to the image.

The method 500 starts at step 502, and proceeds to step 504. At step 504, the method 500 copies the user selection of the current working layer and stores it in a temporary channel. A channel is similar to a layer. A channel stores a selection as an editable mask in a Channels panel (similar to the Layers panel). The channel, which contains the selection, may be used to reload a selection at any time, or as in the present case, to load it into another image, i.e. to apply the selection to another layer. The method 500 proceeds to step 506. At step 506, the method 500 merges the visible layers as described above in step 404 of method 400 above. The method 500 proceeds to step 508. At step 508, the method 500 applies the effect to the merged layers as described in step 406 of method 400 above. The current working layer is the merged layer. The method 500 proceeds to step 510.

At step 510, the method 500 creates a layer mask based on the user selection copied above in step 504 (which was stored in the temporary channel) and installs the layer mask on the current working layer. The method 500 proceeds to step 512. At step 512, the method 500 applies the user strokes input for image editing to the layer mask by making the linked merged layer+layer mask the working layer. The method 500 proceeds to step 514 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 6:
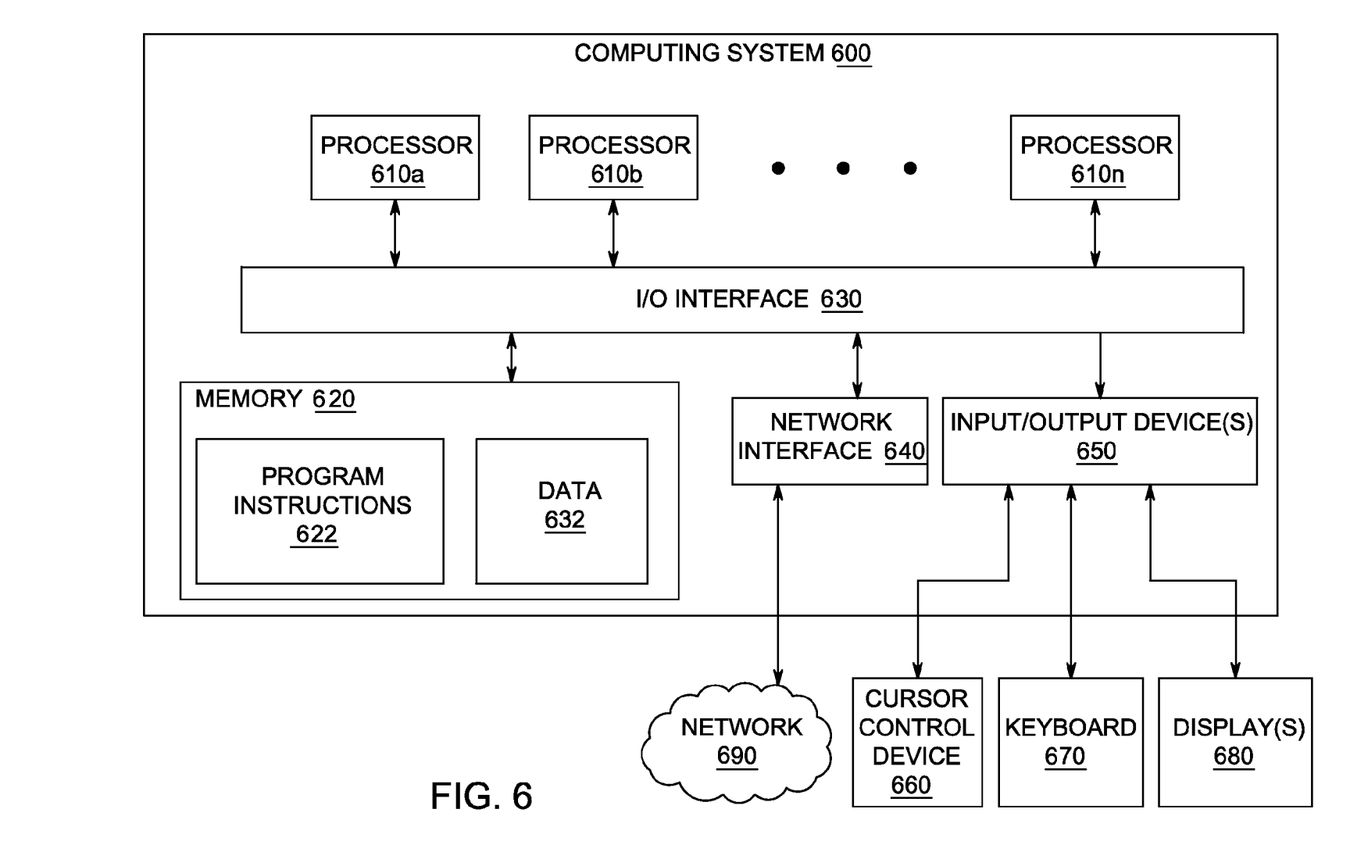
FIG. 6 depicts a computer system that can be utilized in various embodiments of the present invention, according to one or more embodiments of the invention.

FIG. 6 depicts a computer system that can be used to implement the methods of FIGS. 3-5 in various embodiments of the present invention, according to one or more embodiments of the invention. FIG. 6 depicts a computer system that can be utilized in various embodiments of the present invention to implement the computer 102, according to one or more embodiments.

Various embodiments of method and apparatus for an improved workflow for digital image editing, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300, 400 and 500, as processor-executable executable program instructions 622 (e.g., program instructions executable by processor(s) 610) in various embodiments.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of components may be utilized by the system to receive user input described above. In various embodiments, a user interface (e.g., user interface) may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650, In some embodiments, I/O interface 630 may perform any necessary protocol, timing or other data transformations to convert data signals from one components (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touch pads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 3-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   accessing, by a processor, a file containing a plurality of effects to apply to an image;
   merging, by a processor, a plurality of visible layers of the image to create a merged layer;
   applying, by the processor, the plurality of effects to the merged layer;
   installing, by the processor, a layer mask on the merged layer; and
   applying, by the processor, a plurality of strokes received during an image editing process to the installed layer mask.

2. The method of claim 1, further comprising linking a marker to the installed layer mask, wherein selecting the marker causes the marked layer mask to automatically become active during the editing process.

3. The method of claim 1, wherein each layer comprises at least one of a pixel image or an adjustment to an image.

4. The method of claim 1, wherein merging comprises retaining the plurality of visible layers of the image.

5. The method of claim 1, wherein applying the plurality of effects comprises reading a selection location where the plurality of effects is to be applied.

6. A computer implemented method for switching from a first effect to a second effect when editing an image, the method comprising:
   copying, by a processor, a selection of a current working layer;
   storing, in a memory, the selection in a temporary file;
   deleting, by the processor, the current working layer;
   merging, by the processor, a plurality of visible layers of the image to create a merged layer;
   installing, by the processor, a layer mask on the merged layer; and
   applying, by the processor, a plurality of strokes received when editing the image, to the layer mask.

7. The method of claim 6, wherein each layer comprises at least one of a pixel image or an adjustment to an image.

8. The method of claim 6, wherein merging does not alter the plurality of visible layers of the image.

9. The method of claim 6, wherein the layer mask is created based on the user selection.

10. An apparatus for applying a plurality of effects to an image during an editing process, comprising:
    an effects module for accessing a file comprising a plurality of effects to apply to an image, merging a plurality of visible layers of the image to create a merged layer, applying the plurality of effects to the merged layer, installing a layer mask on the merged layer, and applying a plurality of user strokes made during an image editing process to the layer mask; and
    a layer switching module for copying a selection of a current working layer, storing the copied selection in a temporary file, copying a user selection of a current working layer, storing the user selection in a temporary file, deleting the current working layer, merging a plurality of visible layers of the image to create a merged layer, installing a layer mask on the merged layer, wherein the layer mask is created based on the user selection, and applying a plurality of user strokes made during the editing process to the layer mask.

11. The apparatus of claim 10, wherein the current working layer comprises a layer mask.

12. The apparatus of claim 10, wherein the current working layer comprises a plurality of applied effects.

13. A non-transient computer readable medium for storing computer instructions that, when executed by at least one processor cause the at least one processor to perform a method for applying a plurality of effects to an image comprising:
    accessing a file containing a plurality of effects to apply to an image;
    merging a plurality of visible layers of the image to create a merged layer;
    applying the plurality of effect to the merged layer;
    installing a layer mask on the merged layer; and
    applying a plurality of user strokes made during an editing process, to the layer mask.

14. The computer readable medium of claim 13, further comprising linking a marker to the installed layer mask, wherein selecting the marker causes the marked layer mask to automatically become active during an editing process.

15. The computer readable medium of claim 13, wherein each layer comprises at least one of a pixel image or an adjustment to an image.

16. The computer readable medium of claim 13, wherein merging does not alter the plurality of visible layers of the image.

17. The computer readable medium of claim 13, wherein applying the plurality of effects comprises reading a selection location where the plurality of effects is applied.

18. A non-transient computer readable medium for switching from a first effect to a second effect when editing an image comprising:
- copying a user selection of a current working layer;
- storing the user selection in a temporary file;
- deleting the current working layer;
- merging a plurality of visible layers of the image to create a merged layer;
- installing a layer mask on the merged layer, wherein the layer mask is created based on the user selection; and
- applying a plurality of user strokes made during an editing process, to the layer mask.

19. The computer readable medium of claim 18, wherein each layer comprises at least one of a pixel image or an adjustment to an image.

20. The computer readable medium of claim 18, wherein merging does not alter the plurality of visible layers of the image.

* * * * *